United States Patent [19]
Yekutiely

[11] Patent Number: 5,526,408
[45] Date of Patent: Jun. 11, 1996

[54] COMMUNICATION SYSTEM

[76] Inventor: Barak Yekutiely, 10 Doley St., Kefar Havradim, Israel

[21] Appl. No.: 201,629

[22] Filed: Feb. 25, 1994

[30] Foreign Application Priority Data

Feb. 26, 1993 [IL] Israel ........................................ 104871

[51] Int. Cl.$^6$ ............................................. H04M 11/00
[52] U.S. Cl. .................................. 379/90; 379/97; 379/93
[58] Field of Search .................................. 379/90, 88, 89, 379/96, 97, 98, 99, 93; 395/2

[56] References Cited

U.S. PATENT DOCUMENTS

| | | | |
|---|---|---|---|
| 5,196,943 | 3/1993 | Hersee et al. | 379/88 |
| 5,243,643 | 9/1993 | Sattar et al. | 379/88 |
| 5,274,738 | 12/1993 | Daly et al. | 395/2 |
| 5,283,638 | 2/1994 | Engberg | 379/90 |

*Primary Examiner*—Curtis Kuntz
*Assistant Examiner*—Stella L. Woo
*Attorney, Agent, or Firm*—Ostrolenk, Faber, Gerb, Soffen

[57] ABSTRACT

A communication device capable of receiving, processing and sending analog signals, characterized in that the device is coupled to the audio input/output ports of a built-in or external sound attached to a computer, through standard audio plugs. The device may be installed as a stand-alone unit between the audio board and a telephone line, or as a part of the audio board. During its operation the device is constantly under the control of software operating in the computer side. Signals entering through the audio inport and digitized, filtered, and analyzed by software modules, and the software then manages the information-outputs information and/or saves voice massage, etc.-in accordance with contents of these signals.

18 Claims, 3 Drawing Sheets

COMMUNICATION SYSTEM

BACKGROUND OF THE INVENTION

The present invention relates to the utilization of the I/O ports of the audio boards and audio capable computers (built-in sound cards) for communication purposes.

The audio board, also referred to as "voice card" or as "line card", is a component in a proprietary or pc-based multimedia system. The audio board accepts input from an analogue source (e.g., a microphone, or a CD player) and turns it into a file that can be stored on a hard disc. This file can be played back later on, with the board turning the digital data back into analog signals receivable by headphones, speakers, an amplifier, or any such kind devices.

Hence, audio boards convert analogue speech into digital characters, store the information for retrieval, and synthesize the information back into human voice capable of being listened by a caller.

Conventionally, the I/O terminals of such boards are standard audio plugs, namely of the kind provided on audio microphones, audio headsets, etc.

The accuracy of the sound reproduction by the sound board is governed by two factors. The sampling rate, which is the rate by which the sound board samples the incoming audio signals; and the resolution, that is the number of bits used to store each sample. The higher the sample rate and the higher the resolution, the better the quality of the audio reproduction. However, each of these factors requires considerable disk space.

The traditional voice processing function has been the voice mail function which employed computers to store messages electronically. Since then, voice processing systems evolved to more sophisticated capabilities, such as automated call routing and distribution, interactive voice response, collection of voice and data messages from a single source, and voice recognition systems that allow users to interact with computers by speaking certain commands into their telephones.

The currently commercially available products which offer those capabilities are controlled by digital I/O such as the RS232 or RS422 port, which means the utilization of valuable and expensive computer resources.

A further drawback of the existing systems resides in that they are not compatible with all computer platforms. Still another drawback of the existing systems is that they need allocation of COM ports with ADD-IN boards, and are not self configuring.

It is therefore the general object of the invention to utilize the audio I/O ports of the existing sound boards and sound capable computers to offer a direct telephone/PABX communication channel in addition to the regular capabilities of those boards, such as voice synthesis applications.

It is further object of the invention to provide a low cost alternative to an expansive, multi-features phone, such as including the functions of flashhook, hold, speed dialing, pulse dialing, speakerphone, etc.

It is a still further object of the invention to provide a computer based answering machine, a computer based fax, a computer based data modem, etc., that is, a computer based communication device that operates as one of the above mentioned machines depending on the software installed in the computer.

It is a still further object of the invention to provide for easy installation, self configuring, and easy usage of a computer system.

It is a still further object of the invention to enable upgradability of communication features by software. Such as: 1. caller I.O.; 2. ANI—Automatic Number Identification; 3. Audio TEX for telephone. The computer can "say" the contents of a file or user input data, upon request from user or caller; 4. voice recognition capabilities can also be used with the device to allow users to dial just by "saying" "Dial" or for controlling the devices mode of operation etc.

It is a still further object of the invention to optionally substitute the external power source of the system by the telephone line power supply.

It is a still further object of the invention to provide a device that is compatible with all computer platforms, and is annexable to all computers/portable computers via the audio I/O ports of the sound board.

It is a still further object of the invention to provide a device of small size so that it would not take desktop space, and can optionally be merged into and become an integral part of the sound board.

SUMMARY OF THE INVENTION

According to a broad aspect of the invention there is provided a communication system comprising a computer with a built-in/external sound board connectable through audio input/output ports, and a communication device capable of receiving, processing and sending analog signals, characterized in that the device is coupled to the said ports.

The device may be installed as a stand-alone unit between the audio board and a telephone line, or as a part of the audio board.

BRIEF DESCRIPTION OF THE DRAWINGS

Further objects and advantages of the present invention will become better understood in the light of the ensuing description of a few preferred embodiments thereof taken in conjunction with the accompanying drawings, in which.

DETAILED DESCRIPTION OF THE PREFERRED EMBODIMENT

Figure 1:
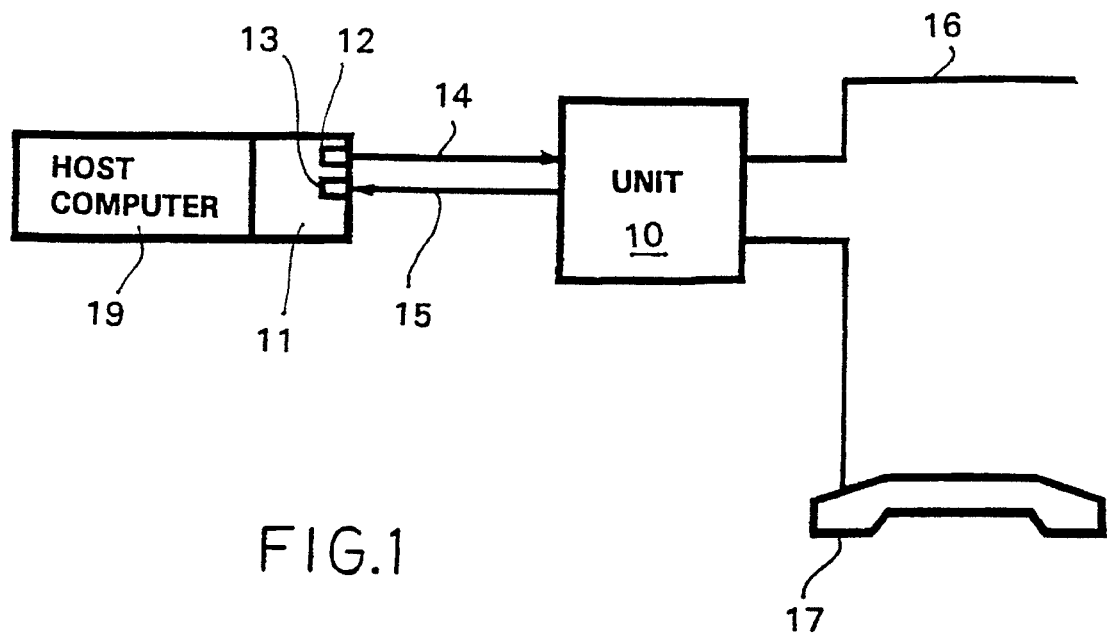
FIG. 1 is a diagram of the device in its environment.

Referring to FIG. 1, there is schematically illustrated a unit, generally denoted 10, representing main functional features of the system provided according to present invention. The unit 10 is connected to a sound board 11 incorporated in a computer 19, coupled thereto by means of input/output terminals 12 and 13 of such sound boards via standard audio plugs 14 and 15, to the telephone line 16, and optionally to a telephone handset/headset 17.

Figure 2:
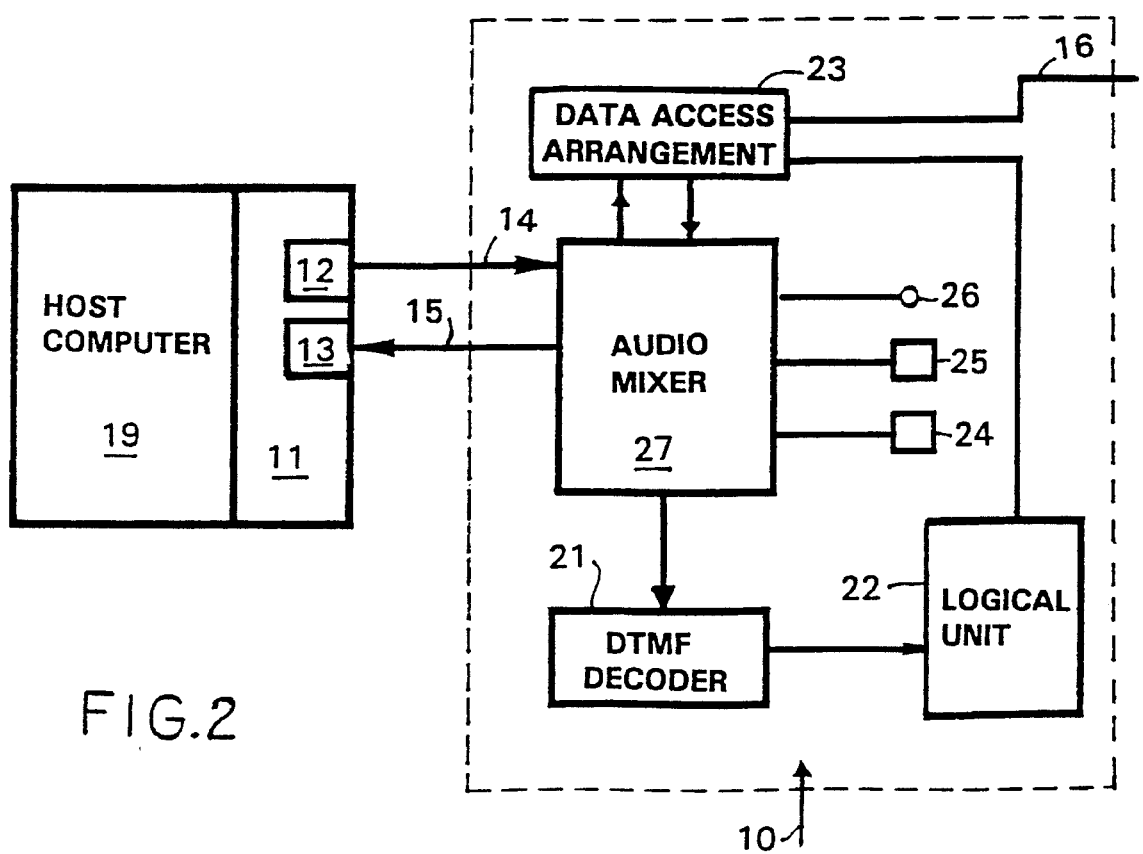
FIG. 2 is a block diagram of the device's main components.

FIG. 2 illustrates the main components of unit 10. There is provided a DTMF decoder 21, a logical unit 22, a data access arrangement 23, a speaker 24, an earpiece 25 and microphone 26, and audio mixers/amplifiers 27.

The audio board 11 is capable of digitizing audio signals, store them in digitized form on the hard drive in the computer 19, retrieve the signals and output them in audio form by digital-to-analog conversion. These capabilities are found in conventional sound board applications.

The communication protocols used by unit 10 are via DTMF signals. Unit 10 accepts computer generated DTMF signals together with audio synthesized signals and differentiates between them in unit 27. The DTMF signals produced by the computer 19 may function both as control signal for unit 10 and as dial out signals. Unit 21 decodes the DTMF signals and transfers them to the logical unit 22, which controls the operation of unit 10. If, for instance, a stream of DTMF signals starts with control signals directing unit 10 to seize the telephone line, then the rest of the stream is dialed out in the form of DTMF signals.

During the operation of the device 10, the audio-in port 13 is constantly under the control of software operating in the computer side. The signals entering through the audio-in port are digitized, filtered and analyzed by software modules operating in the computer. DTMF and audio signals coming in are recognized by the software, and the software then either outputs information or saves a voice message, in accordance with the nature and the contents of those signals.

Unit 10 operates in conjunction with the above mentioned software, which would be classified as "high level" software, which controls the high level functions of the device 10, and with the software that "drives" the sound board.

In its standard mode of operation the device accepts signals either from the computer or through the telephone line. The computer generates DTMF signals together with synthesized audio signals, and the device is capable of differentiating between the two. The DTMF signals coming out of the computer towards the device function as control signals applied to the device. For example, control signals like place the phone line off hook, or place a conversation on hold, or determine the device mode of operation, etc. Once the phone line is seized, the DTMF signals are used for dialing out. DTMF and audio signals coming in through the telephone line are transferred to the audio-in port which is under constant software control from the computer side. Those signals are digitized, filtered, analyzed and recognized by suitable conventional software, and the software application has the capability to determine the further processing step or steps, e.g. either output the information in response, or save a voice message, or both. Due to the structure of device 10, and the nature of the software operating in computer 19, there are various possible options for the device's operation, such as answering machines; record greetings; voice mail; speakerphone; call screening; message forwarding; hold; music on hold; mute mic.; dial from directory; dial manual; auto dial and repeat; go off hook; go on hook, and the like, while several options can be chosen to function all at once, for a speakerphone plus music on hold plus call screening.

Figure 3A:
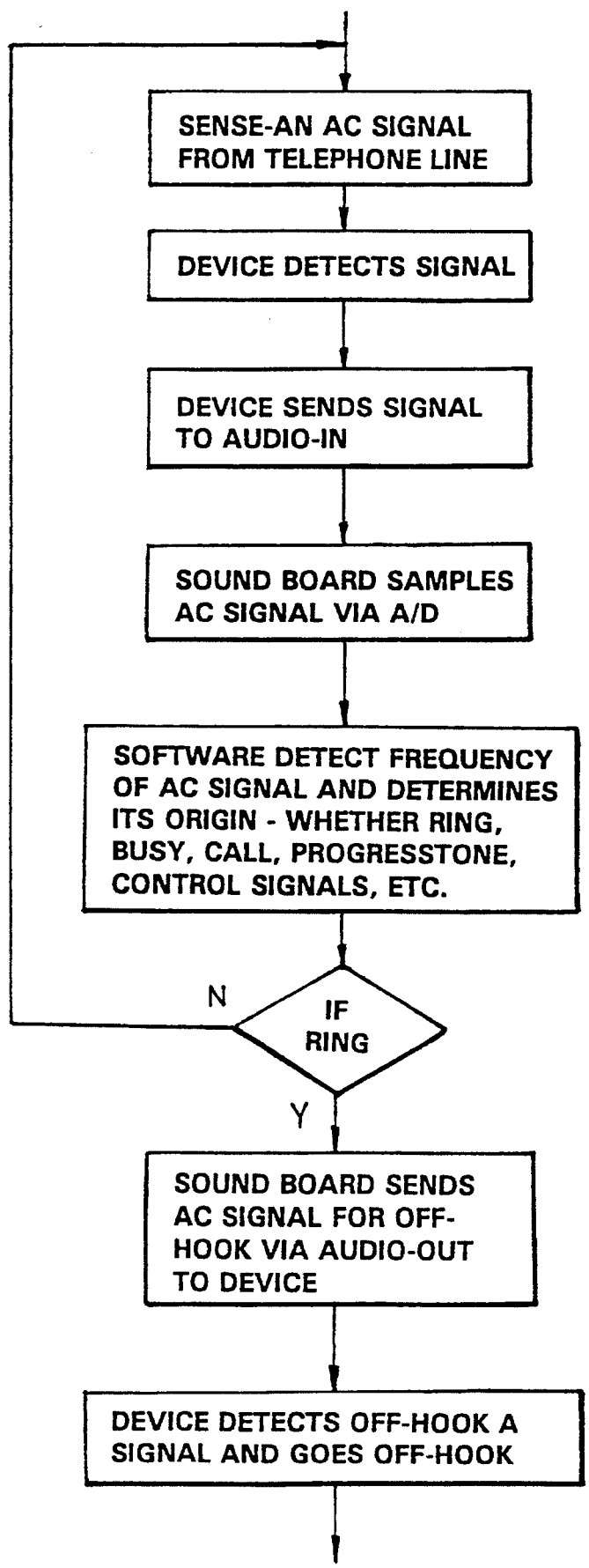
FIG. 3 is a flowchart of the algorithm of the system operating as an answering machine, illustrating one of the various possible options of the system.
Figure 3B:
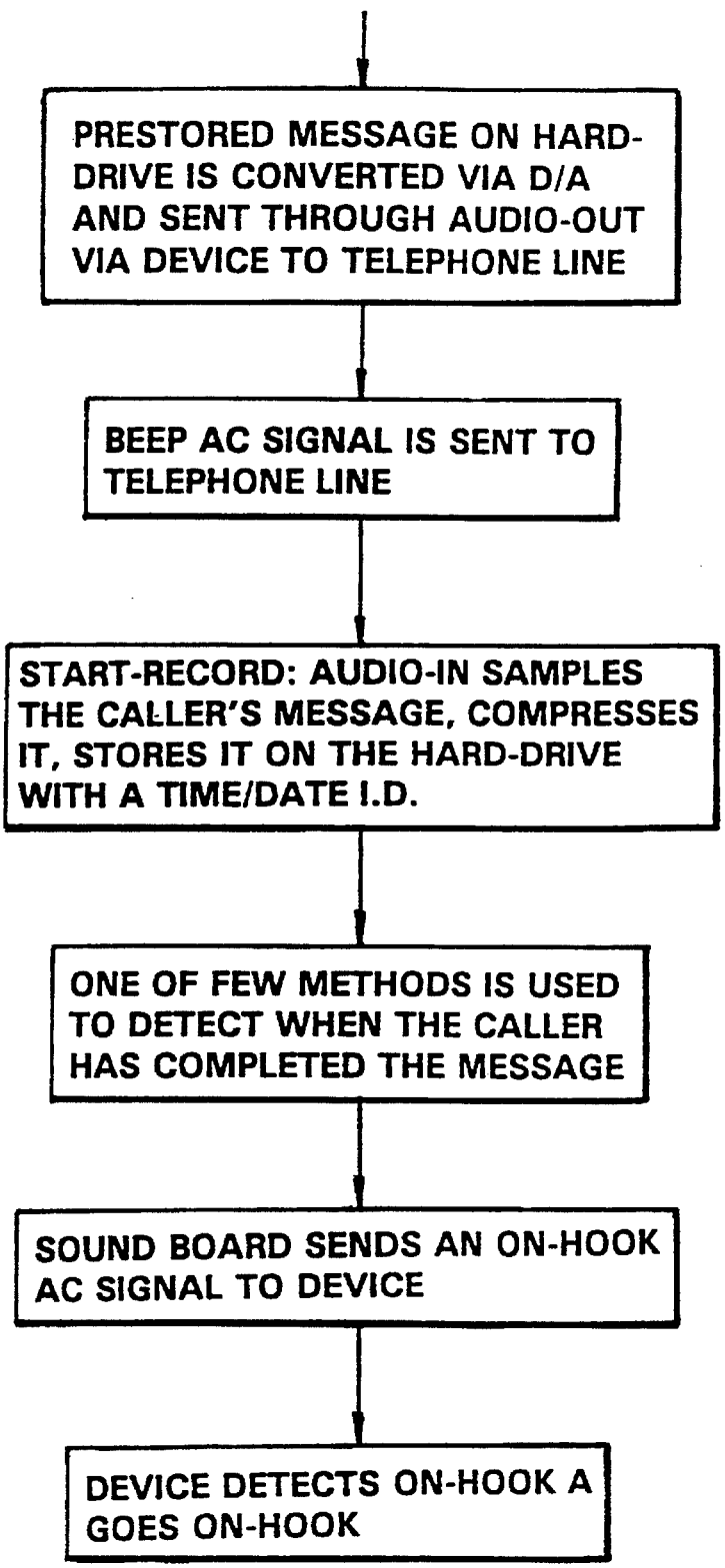

For instance, in an answering machine mode of operation, which is diagrammatically shown in FIG. 3, when a ring is received from the telephone line 16, device 10 recognizes the ring and transmits it to the audio-in plug portion 15. The scanning software is adapted to control, for instance, the number of rings, till it dials a DTMF control signal to unit 10 to seize the line. After the line is seized, the computer 19 outputs a prerecorded message to the audio out 14, which is routed, under the control of logical unit 22, to the telephone line. After the beep, the audio-in port 15 records the caller message and stores it on the hard drive for later retrieval. The computer then outputs a different DTMF signal to device 10, in order to place the device on hook.

All these operationed steps are performed in the background, which means that the computer user is not interfered during the screening of the incoming calls.

The initial power to the device 27 is supplied by the audio signals coming out of the sound board 11. After line is seized with the "off hook" signal, the device gets power from the telephone line.

Those skilled in the art to which the present invention pertains will readily appreciate that numerous changes, modifications and variations may be applied to the invention without departing from the scope thereof as defined in and by the appended claims.

What is claimed is:

1. An apparatus for bi-directional analog communication of telephone data with a host computer, the host computer having an A/D converter for converting analog data received from the apparatus to digital data and a D/A converter for converting digital data to analog data to be sent to the apparatus, the apparatus comprising:

a data access arrangement having a telephone line interface for connection to a telephone line, the data access arrangement also having a bi-directional interface, the data access arrangement outputting signals responsive to signals received from the telephone line interface to the bi-directional interface;

an audio mixer connected to the bi-directional interface of the data access arrangement for receiving the signals output to the bi-directional interface by the data access arrangement, wherein the audio mixer has a first analog output for connection with the host computer, for forwarding signals received by the bi-directional interface of the audio mixer to the host computer, the audio mixer additionally having a second analog output;

a DTMF decoder connected to the second analog output of the audio mixer, the DTMF decoder for generating a signal representative of a DTMF signal in response to receiving a DTMF signal from the audio mixer; and a logical unit operatively connected to the DTMF decoder for receiving the signal generated by the DTMF decoder, the logical unit being coupled to the data access arrangement to provide instructions to the data access arrangement.

2. The apparatus claimed in claim 1, wherein the audio mixer additionally comprises a first analog input to receive signals from the host computer.

3. The apparatus claimed in claim 2, wherein the audio mixer sends DTMF signals received over the first analog input of the audio mixer to the DTMF decoder via the second analog output.

4. The apparatus claimed in claim 2, wherein the audio mixer sends signals received over the first analog input of the audio mixer to the data access arrangement via the bi-directional interface.

5. The apparatus claimed in claim 2, wherein the audio mixer is adapted to receive power from the host computer via the first analog input.

6. The apparatus claimed in claim 1, wherein the data access arrangement is configured to receive power from a telephone line connected to the telephone line interface when said telephone line is "OFF-HOOK".

7. The apparatus claimed in claim 1, wherein the instructions that the logical unit provides to the data access unit includes an instruction to seize a telephone line.

8. The apparatus claimed in claim 1, wherein the instructions that the logical unit provides to the data access unit includes an instruction to release a telephone line.

9. The apparatus claimed in claim 1, wherein the audio mixer additionally comprises a speaker, and wherein signals received from the bi-directional interface with the data access arrangement are sent to the speaker.

10. The apparatus claimed in claim 1, wherein the audio mixer additionally comprises a microphone, and wherein the audio mixer forwards signals received from the microphone to the bi-directional interface.

11. The apparatus claimed in claim 1, wherein the data access arrangement sends signals received from the audio mixer to the telephone line interface.

12. The apparatus claimed in claim 1, wherein the data access arrangement sends a telephone ring signal received at the telephone line interface to the audio mixer via the bi-directional interface, and the audio mixer forwards the telephone ring signal to the host computer via the first analog output.

13. The apparatus claimed in claim 1, further comprising a host computer, the host computer having an A/D converter for converting analog data received from the audio mixer to digital data.

14. The apparatus claimed in claim 2, further comprising a host computer, the host computer having an A/D converter for converting analog data received from the audio mixer to digital data, the host computer also having a D/A converter for converting digital data to analog data to be sent to the audio mixer.

15. The apparatus claimed in claim 14, wherein the host computer has a bus, the A/D converter is adapted to receive analog signals from the audio mixer and convert it to digital data on the bus.

16. The apparatus claimed in claim 15, wherein the D/A converter is adapted to convert digital data received on the bus to analog data, and transmit the analog data to the audio mixer.

17. The apparatus claimed in claim 16, further comprising host software, the host software configured to transmit DTMF signals via the D/A converter, the DTMF signals including an instruction that the data access arrangement seize the telephone line.

18. The apparatus claimed in claim 16, further comprising host software, the host software configured to monitor the digital representation of the analog data received by the A/D converter and transmit DTMF signals via the D/A converter instructing the data access arrangement seize the telephone line in response to a digital representation of a telephone ring.

* * * * *